United States Patent
Choi et al.

(10) Patent No.: US 10,128,915 B2
(45) Date of Patent: *Nov. 13, 2018

(54) MOBILE TERMINAL

(71) Applicant: LG ELECTRONICS INC., Seoul (KR)

(72) Inventors: Jaehyun Choi, Seoul (KR); Hyengcheul Choi, Seoul (KR); Deuksu Choi, Seoul (KR); Dongjin Kim, Seoul (KR); Chisang You, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/841,093

(22) Filed: Dec. 13, 2017

(65) Prior Publication Data

US 2018/0109295 A1 Apr. 19, 2018

Related U.S. Application Data

(63) Continuation of application No. 15/246,757, filed on Aug. 25, 2016, now Pat. No. 9,876,538.

(30) Foreign Application Priority Data

Mar. 3, 2016 (KR) .................. 10-2016-0025937

(51) Int. Cl.
*H04B 1/38* (2015.01)
*H04B 5/00* (2006.01)
(Continued)

(52) U.S. Cl.
CPC ............ *H04B 5/0093* (2013.01); *H01Q 7/00* (2013.01); *H02J 5/005* (2013.01); *H02J 7/0042* (2013.01);
(Continued)

(58) Field of Classification Search
CPC .. H01Q 7/00; H02J 7/025; H02J 50/12; H02J 5/005; H02J 7/0042; H04B 5/0031;
(Continued)

(56) References Cited

U.S. PATENT DOCUMENTS 6,320,484 B1 11/2001 Furuya et al.
8,958,855 B2 * 2/2015 Shin .................... H04M 1/0277
455/121

(Continued)

FOREIGN PATENT DOCUMENTS

EP 2913935 9/2015
GB 2484540 4/2012
(Continued)

OTHER PUBLICATIONS

European Patent Office Application Serial No. 16189602.2, Search Report dated Mar. 7, 2017, 17 pages.

*Primary Examiner* — Nhan Le
(74) *Attorney, Agent, or Firm* — Lee, Hong, Degerman, Kang & Waimey (57) ABSTRACT

There is disclosed a mobile terminal including a housing comprising a first metal case, a second metal case and a first non-conductive case arranged between the first metal case and the second metal case, a battery embedded in the housing, a first coil arranged in an area covered by the first metal case inside the housing, a main board comprising a charging module implemented to recharge the battery using electric currents which flow in the first coil, and a first resonator arranged in an area covered by the first non-conductive case and comprising a first matching circuit corresponding to a first frequency, such that the examples of the mobile terminal in accordance with the present disclosure may enhance performance of the wireless communication unit and wireless charging performance, without design change of the housing having the metal case.

13 Claims, 10 Drawing Sheets

(51) Int. Cl.
  *H01Q 7/00* (2006.01)
  *H02J 5/00* (2016.01)
  *H02J 7/00* (2006.01)
  *H02J 7/02* (2016.01)
  *H02J 50/12* (2016.01)
  *H04W 4/80* (2018.01)

(52) U.S. Cl.
  CPC .............. *H02J 7/025* (2013.01); *H02J 50/12* (2016.02); *H04B 5/0031* (2013.01); *H04B 5/0037* (2013.01); *H04B 5/0081* (2013.01); *H04W 4/80* (2018.02)

(58) Field of Classification Search
  CPC .. H04B 5/0037; H04B 5/0081; H04B 5/0093; H04W 4/80
  See application file for complete search history.

(56) References Cited

U.S. PATENT DOCUMENTS

| | | | |
|---|---|---|---|
| 9,735,628 B2* | 8/2017 | Efe | H02J 50/12 |
| 9,876,538 B2* | 1/2018 | Choi | H01Q 7/00 |
| 2011/0285348 A1* | 11/2011 | Hong | H01F 5/003 |
| | | | 320/108 |
| 2014/0203981 A1 | 7/2014 | Nakano et al. | |
| 2015/0249292 A1 | 9/2015 | Ouyang et al. | |
| 2016/0006293 A1 | 1/2016 | Jeong et al. | |
| 2016/0261026 A1 | 9/2016 | Han et al. | |
| 2017/0054213 A1 | 2/2017 | Singh et al. | |
| 2017/0257148 A1 | 9/2017 | Choi et al. | |

FOREIGN PATENT DOCUMENTS

| | | |
|---|---|---|
| KR | 101584555 | 1/2016 |
| WO | 2011076582 | 6/2011 |

* cited by examiner

MOBILE TERMINAL

CROSS-REFERENCE TO RELATED APPLICATIONS

The application is a continuation of U.S. patent application Ser. No. 15/246,757, filed on Aug. 25, 2016, now U.S. Pat. No. 9,876,538, which claims the benefit of earlier filing date and right of priority to Korean Patent Application No. 10-2016-0025937 filed on Mar. 3, 2016, the contents of which are all incorporated by reference herein in their entirety.

BACKGROUND OF THE DISCLOSURE

Field of the Disclosure

Embodiments of the present disclosure relate to a mobile terminal having an improved function in wireless communication.

Background of the Disclosure

Terminals may be generally classified as mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

As such functions become more diversified, the mobile terminal can support more complicated functions such as capturing images or video, reproducing music or video files, playing games, receiving broadcast signals, and the like. By comprehensively and collectively implementing such functions, the mobile terminal may be embodied in the form of a multimedia player or device.

By extension, such functions may become more improved as the mobile terminal is able to transmit and receive information, using wireless communication with an external device. For example, the mobile terminal may be configured to implement specific functions such as data transmission with other terminals. In addition, the mobile terminal works as a mobile payment system. As the functions become more diversified and improved, battery use increases and there are more needs for a wireless charging manner which allows charging only when the mobile terminal is located near a charger even without auxiliary cables.

A simple design is preferred in relation with an exterior appearance of the mobile terminal and metal materials are highly favored. In case of using such a metallic material, there is an issue of quality degradation of internal components, especially, components related to wireless communication or wireless charging.

SUMMARY OF THE DISCLOSURE

Accordingly, an object of the present invention is to address the above-noted and other problems.

An object of the present disclosure is to a mobile terminal having an improved function in wireless communication.

Embodiments of the present disclosure may provide a mobile terminal including: a housing comprising a first metal case, a second metal case and a first non-conductive case arranged between the first metal case and the second metal case; a battery embedded in the housing; a first coil arranged in an area covered by the first metal case inside the housing; a main board comprising a charging module implemented to recharge the battery using electric currents which flow in the first coil; and a first resonator arranged in an area covered by the first non-conductive case and comprising a first matching circuit corresponding to a first frequency.

A slit may be formed by spacing the first metal case a preset distance from the second metal case, and the first non-conductive case may be provided in the slit, and the first resonator may be extended along the slit.

Both ends of the first resonator may be connected to the first metal case.

The main board may be electrically insulated from the first metal case.

The main board may include a ground electrically connected to the first metal case, and at least one end of the first resonator may be connected to the main board.

The mobile terminal may further include a second coil arranged in the housing and configured to implement short range wireless communication, using a signal having a second frequency.

The mobile terminal may further include a second resonator arranged in an area covered by the first non-conductive case and comprising a second matching circuit corresponding to the second frequency.

The first resonator may further include a third matching circuit corresponding to the second frequency; wherein a controller controls the switch to connect the first resonator to the first matching circuit when recharging the battery and to connect the first resonator to the third matching circuit when implementing short range wireless communication.

The second resonator may further include a fourth matching circuit corresponding to the first frequency, and the controller may control the second resonator to be connected to the second matching circuit when implementing the short range wireless communication and to be connected to the fourth matching circuit when recharging the battery.

The second resonator may further include a switch selectively connected to the first metal case or the second metal case, and the controller may control the second resonator to be connected to the first metal case when implementing the short range wireless communication and to be connected to the second resonator when recharging the battery.

The second coil may be arranged in a position corresponding to the second metal case.

The second metal case may be arranged in a predetermined area of the first metal case, and the first coil and the second coil may be embedded in the position corresponding to the first metal case, and the mobile terminal may further include a third metal case provided in the other area of the first metal case; a second non-conductive case provided between the first metal case and the third metal case; and a second resonator arranged in a position corresponding to the second non-conductive case.

The matching circuit may include one or more capacitors.

According to the embodiments of the present disclosure, the examples of the mobile terminal in accordance with the present disclosure may enhance performance of the wireless communication unit and wireless charging performance, without design change of the housing having the metal case.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings, which are given by illustration only, and thus are not limitative of the present invention, and wherein.

DESCRIPTION OF SPECIFIC EMBODIMENTS

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be directly connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra-books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1A:
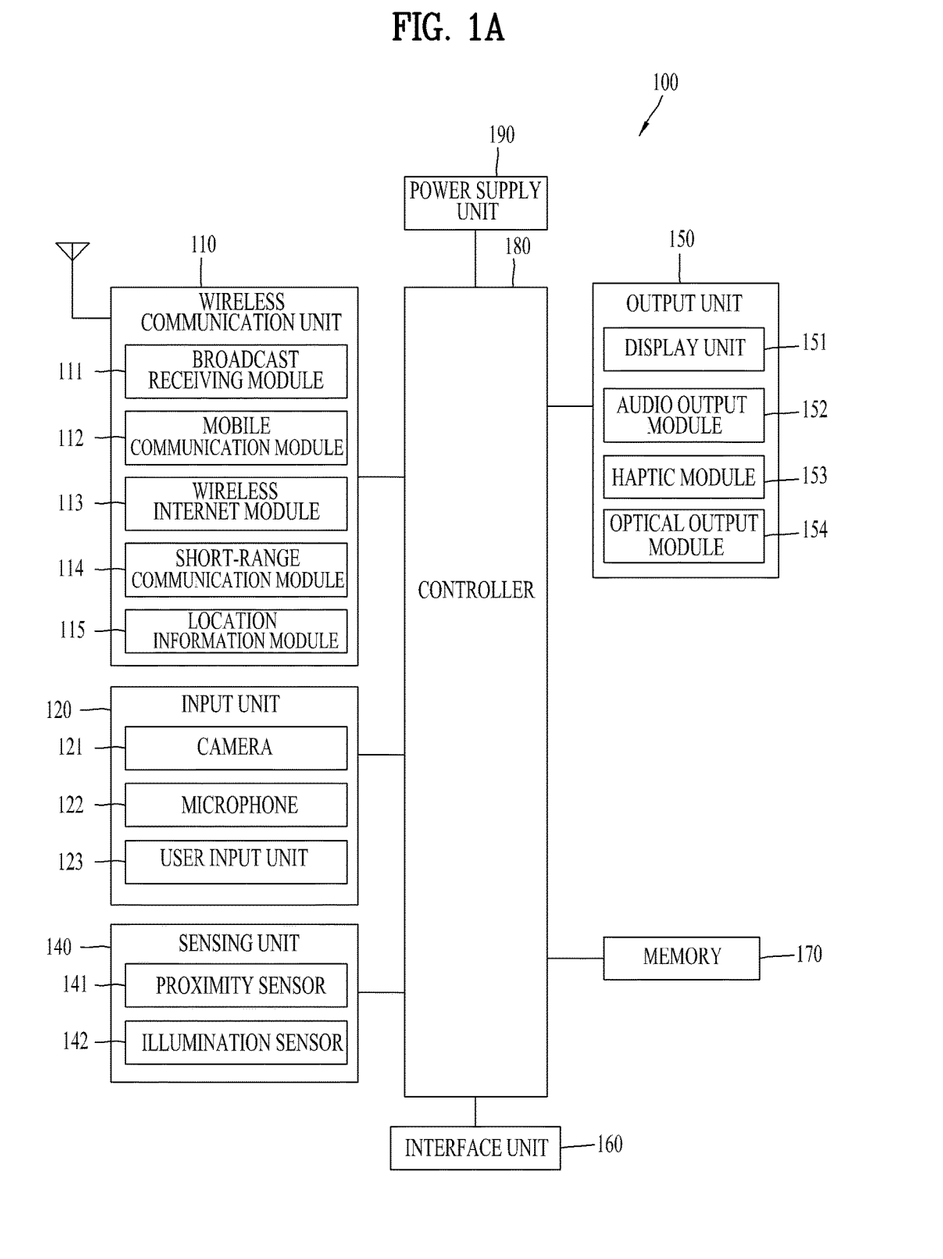
FIG. 1A is a block diagram of a mobile terminal in accordance with the present disclosure.
Figure 1B:
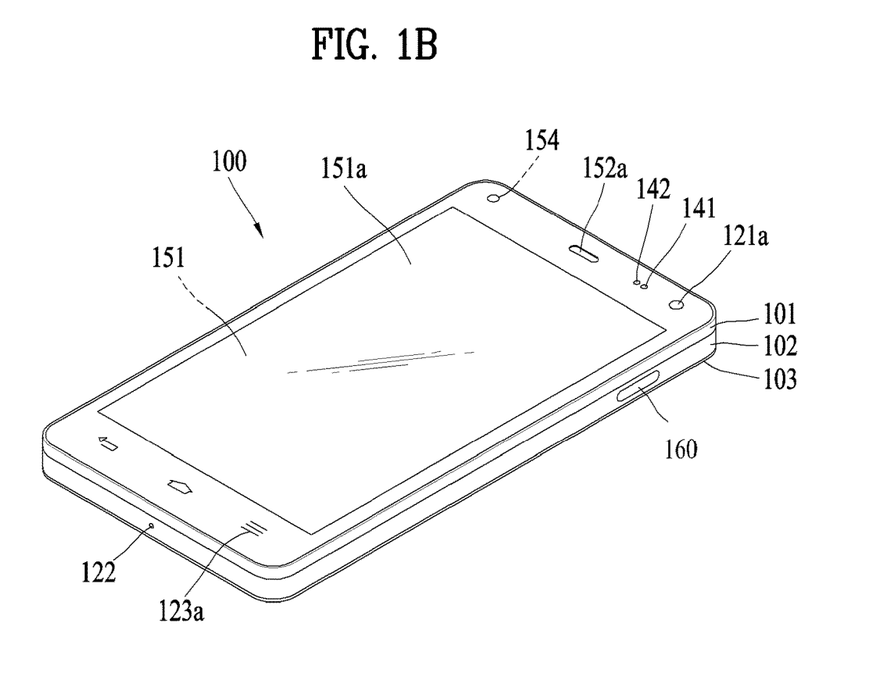
FIGS. 1B and 1C are conceptual views of one example of the mobile terminal, viewed from different directions.
Figure 1C:
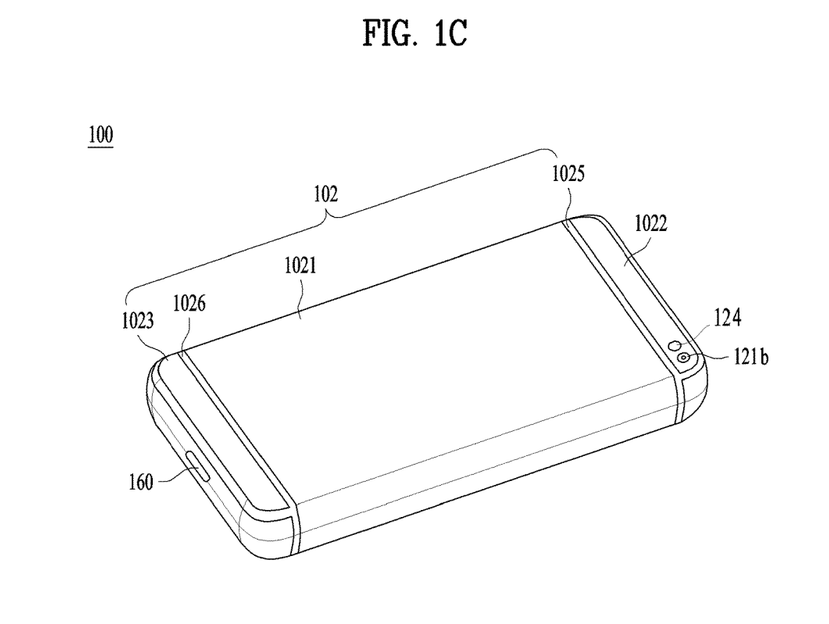

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

Referring now to FIG. 1A, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks.

To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142.

If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs.

The controller 180 may provide or process information or functions appropriate for a user by processing signals, data, information and the like, which are input or output by the various components depicted in FIG. 1A, or activating application programs stored in the memory 170. As one example, the controller 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151*a* of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121*b* or an audio output module 152*b*.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

In case of using metal, a function using an electromagnetic wave such as wireless communication or wireless charging is likely to be affected and results in deterioration of such a function. Accordingly, a non-conductive case formed of a non-conductive case made of a non-conducive material, for example, synthetic resin may be partially arranged to secure the function likely to be affected by metal. Some of the metal cases divided by the non-conductive case may be used as a radiator.

The non-conductive material partially used in the case may make an exterior appearance of the housing look divide, which is likely to deteriorate a design quality. Accordingly, there are increasing needs for a design configured to minimize an area of the non-conductive case made of a non-conductive material.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

FIGS. 1B and 1C depict certain components as arranged on the mobile terminal.

It is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation unit 123a are examples of the user input unit 123, which may be manipulated by a user to provide input to the mobile terminal 100. The first and second manipulation unit 123a may also be commonly referred to as a manipulating portion, and may employ any tactile method that allows the user to perform manipulation such as touch, push, scroll, or the like. The first and second manipulation unit 123a may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof.

Input received at the first and second manipulation unit 123a may be used in various ways. For example, the first manipulation unit 123a may be used by the user to provide an input to a menu, home key, cancel, search, or the like, and the second manipulation unit may be used by the user to provide an input to control a volume level being output from the first or second audio output modules 152a, to switch to a touch recognition mode of the display unit 151, or the like.

Meanwhile, as shown in FIG. 1C, the rear case 102 located in a rear surface of the mobile terminal 100 includes a plurality of metal cases 1021, 1022, 1023 and one or more non-conductive cases. A first metal case 1021 is arranged apart a preset distance from a second metal case 1022 and a non-conductive case is formed between the first and second metal cases 1021 and 1022 by injection-molding a non-conductive material, for example, synthetic resin.

To reduce the quality degradation of the exterior design by using the non-conductive case as mentioned above, the color of the non-conductive case is similar to the color of the metal cases 1021, 1022 and 1023. The distance spaced between the first and second metal cases 1021 and 1022 is uniform and a slit with a preset width is formed, such that the non-conductive case 1025 may be located in the slit. The slit as the space between the first metal case 1021 and the second metal case 1022 is filled with a non-metallic material (in other words, a non-conductive material) which is an injection mold, only to form the non-conductive case 1025.

In the process of forming the non-conductive case 1025, an extended portion may be further provided to cover inner surfaces of the first and second cases 1021 and 1022.

The first metal case 1021 and the second metal case 1022 may be arranged in a vertical direction with respect to the mobile terminal. The slit and the non-conductive case 1025 may be extended in a horizontal direction with respect to the mobile terminal.

If three or more metal cases 1021 are provided, a first metal case 1021 is arranged in a middle portion and a second metal case 1022 is arranged in an upper portion and a third metal case is arranged in a lower portion. Then, a first non-conductive case 1025 is arranged between the first metal case 1021 and the second metal case 1022 and a second non-conductive case 1026 is arranged between the first metal case 1021 and the third metal case 1023.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121b may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121b. When an image of a subject is captured with the camera 121b, the flash 124 may illuminate the subject.

The second audio output module can be located on the terminal body. The second audio output module may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body.

The battery 191 may receive power via a power source cable connected to the interface unit 160. Also, the battery 191 can be recharged in a wireless manner using a wireless charger. Wireless charging may be implemented by magnetic induction or electromagnetic resonance.

The magnetic induction or electromagnetic resonance allows a battery recharged while electric currents flow in a power receiving coil arranged in an area of the magnetic field which is formed by electric currents flowing in a power supplying coil. In other words, the battery is recharged using induced electricity in a manner of electromagnetic resonance. The electromagnetic resonance uses low frequency band signals and the frequency band currently used is according to two standards.

According to WPC standard, a frequency band from 110 kHz to 205 kHz is used. According to PMA standard, a frequency band from 118 kHz to 357 kHz.

Such the electromagnetic resonance has an advantage of good charging performance. While, it has a disadvantage of charging failure if location relation between the electric power supplying coil and the electric power receiving coil which is important in the magnetic induction or electromagnetic resonance is out of joint or distant from each other.

Figure 2:
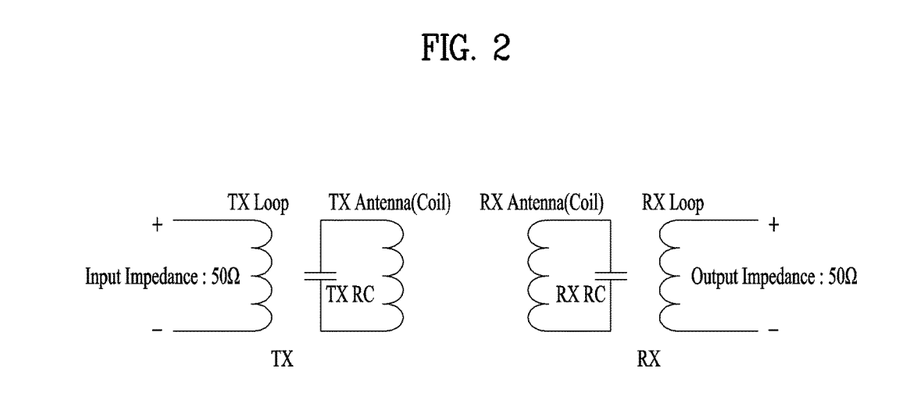
FIG. 2 is a diagram to describe electromagnetic resonance scheme wireless charging applied to one example of the mobile terminal in accordance with the present disclosure.

FIG. 2 is a diagram to describe wireless charging which is implemented by magnetic induction or electromagnetic resonance for the mobile terminal in accordance with the present disclosure. The electromagnetic resonance is the technique configured to recharge a battery in a manner of generating a magnetic field vibrating in an electric power supplying coil at a resonance frequency and transmitting an electric power only to an electric power receiving coil deigned for the same resonance frequency.

In the drawing, a left portion is an electric power supply module. In the left electric power supply module there are provided an electric power supplying coil (TX Loop) configured to receive the electric power and to allow electric currents flow therein and a transmitter (TX Antenna) configured to allow electric currents to flow therein when the electric currents flow in the coil and to radiate an electromagnetic wave corresponding to the resonance frequency.

In the drawing, a left portion is an electric power receiving module. In the electric power receiving module there are provided a receiver (RX Antenna)

When currents flow in the electric power receiver having a resonance frequency which is equal to the resonance frequency of the transmitter (TX Antenna) provided in the electric power supplying module and a wireless charging coil (RX Loop) configured to allow electric currents to flow when electric currents flow in the receiver (RX Antenna) so as to recharge the battery. The transmitter and receiver configured to transmit an electric power using signals at the same resonance frequency are referred to as a resonator.

The resonator (the transmitter (TX Antenna) and the receiver (RX Antenna) includes a matching circuit for matching resonance frequencies. The matching circuit has one or more capacitors to adjust impedances of the transmitter (TX Antenna) and the receiver (RX Antenna).

The electromagnetic resonance means phenomenon in that amplitude of vibration of the frequency generated outside becomes broader while an object having a natural frequency equal to the generated frequency vibrates together. Resonators having the same natural frequency are mounted in a charger and a device designed to be recharged in the charger, to use the electromagnetic resonance. The amplitude of vibration gets broader by using the resonators and the charging manner using the electromagnetic resonance has an advantage that charging is able to be performed in long distance.

An exemplary standard of the electromagnetic resonance is A4WP which uses a frequency band at 7.68 MHz The electromagnetic resonance may have different functions according to the location of the resonator. In case of using the metal case 1021, there is a disadvantage of resonance performance deterioration.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

Figure 3:
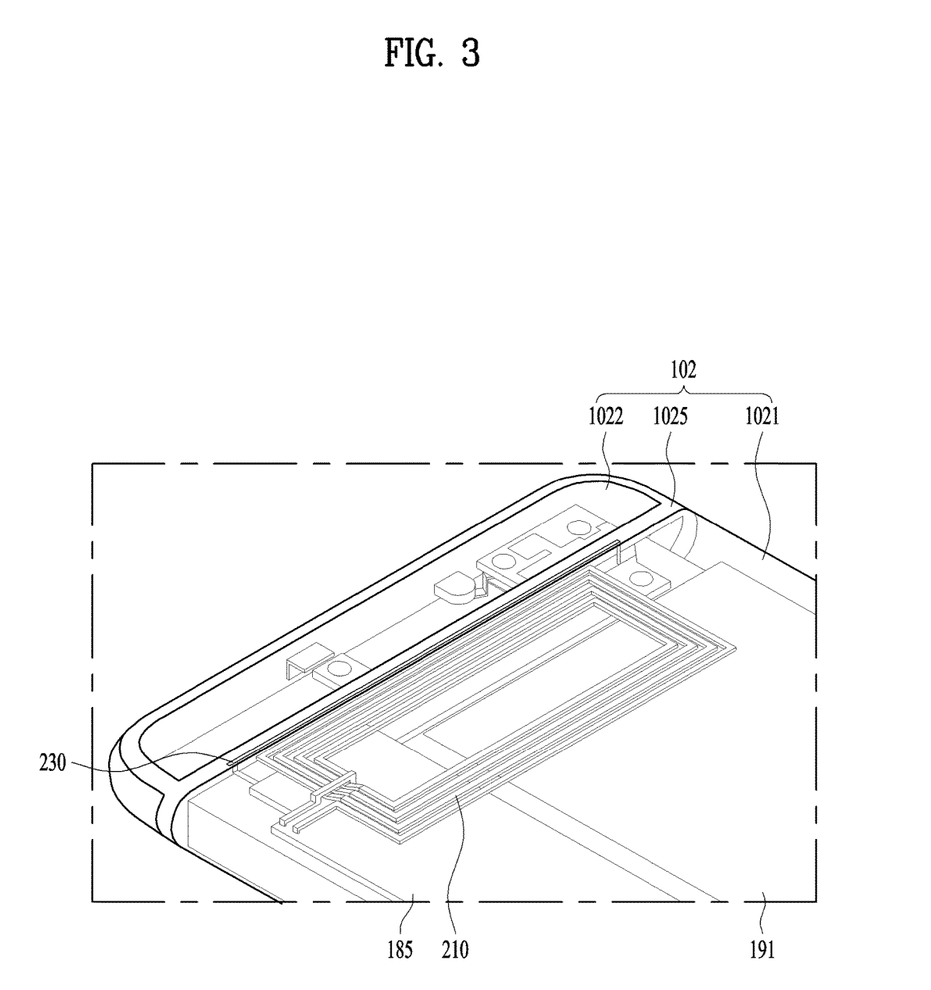
FIG. 3 is a perspective diagram of coil in accordance with the present disclosure.

FIG. 3 is a perspective diagram illustrating a coil 210 in accordance with the present disclosure. In case of using the electromagnetic resonance, a resonator 230 configured to resonate with a resonance frequency of an electric power transmitting device and a wireless charging coil 210 configured to allow electric currents to flow therein by electric currents flowing in the resonator 230.

The resonator 230 is arranged in an area overlapped with the non-conductive case 1025, in other words, an area covered by the non-conductive case 1025. Also, the resonator 230 may be extended in a horizontal direction with respect to the appearance of the non-conductive case 1025.

Meanwhile, the wireless charging coil 210 is not directly affected by external electromagnetic waves but transmitted electric currents via the resonator 230. Accordingly, the wireless charging coil 210 may be arranged in the area hidden by the first metal case 1021. A pair of resonators 230 may be provided and the pair of the resonators 230 has to be impedance-matched with the resonance frequency transmitted by the electric power transmitting device.

Figure 4:
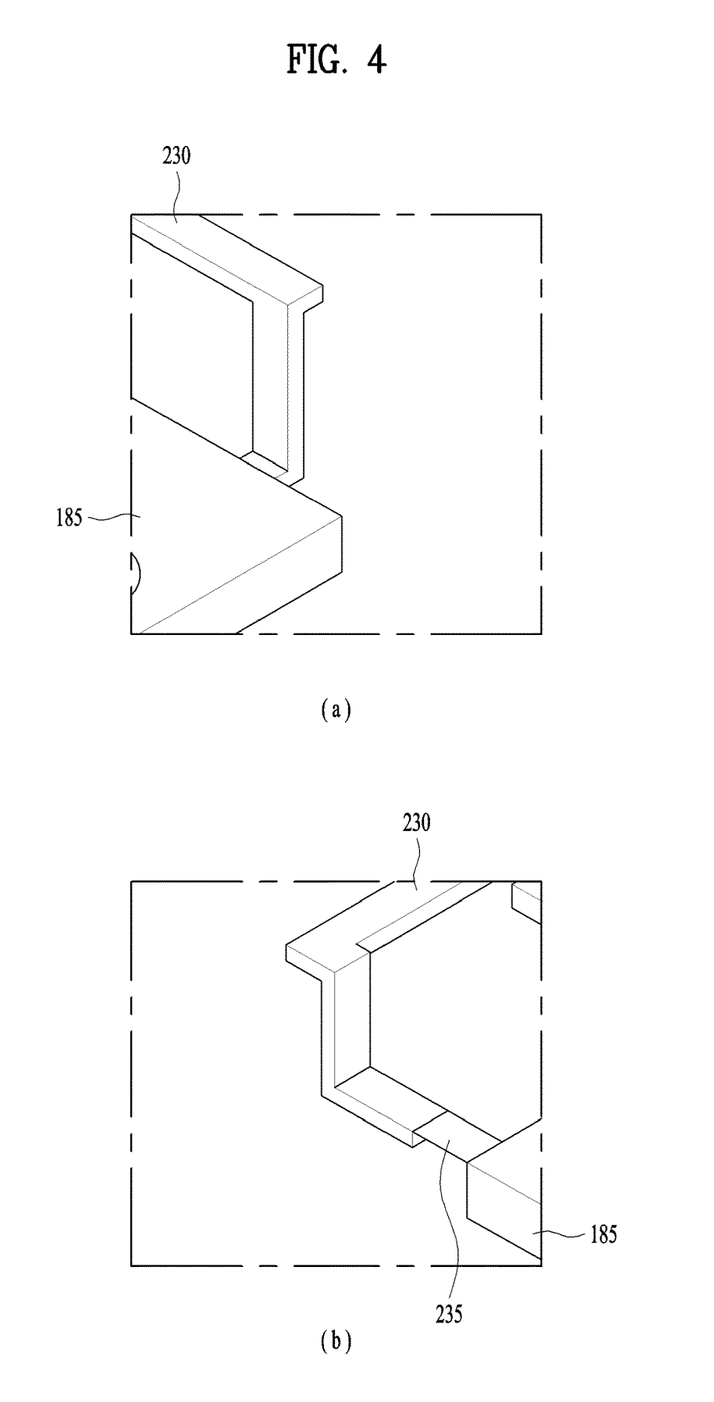
FIG. 4 is an enlarged perspective diagram of both ends of the coil in accordance with the present disclosure.

FIG. 4 is an enlarged perspective diagram illustrating both ends of the coil 210 in accordance with the present disclosure. The resonator 230 is connected to the main board 185 or the first metal case 1021 (see (a) of FIG. 4), and it includes a matching circuit 235 (see (b) of FIG. 4). The matching circuit 230 has a capacitor having a preset capacitance for impedance matching.

The resonator 230 may have a preset impedance value, so that a capacitive reactance and an inductive reactance may be determined according to the frequency. The capacitive reactance and the inductive reactance may determine an overall reactance value.

When the resonator 230 is connected to the first metal case 1021, the first metal case 1021 as it is may be functioned to receive resonance frequency and the wireless charging performance may be improved. When the resonator 230 is connected to a ground of the main board 185, the ground of the main board 185 is connected to the first metal case 1021. When the main board 185 is electrically insulated from the first metal case 1021, the resonator 230 is connected to the first metal case 1021.

Figure 5:
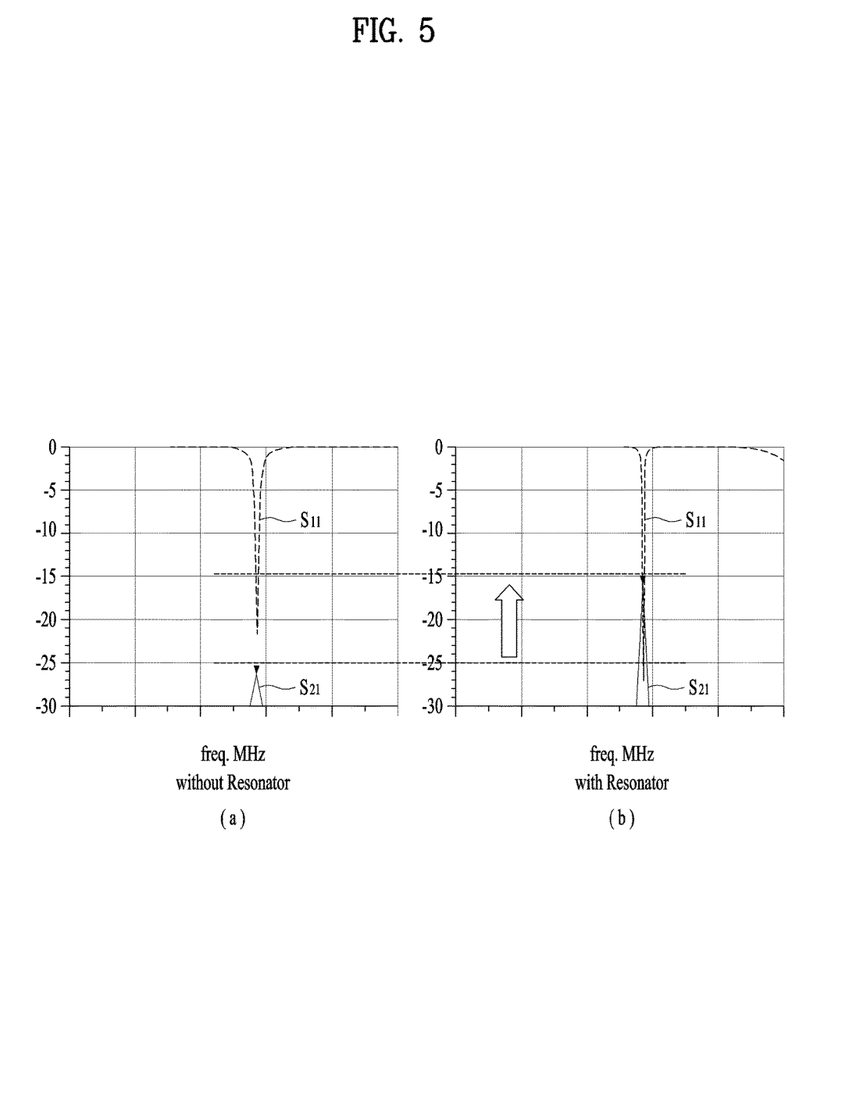
FIG. 5 is a diagram to describe a wireless charging function in accordance with the present disclosure.

FIG. 5 is a diagram to describe wireless charging performance of the coil 210 in accordance with the present disclosure and shows S-parameter. (a) of FIG. 5 shows wireless charging efficiency when no resonators 230 are provided and (b) of FIG. 5 shows wireless charging efficiency when the resonators 230 are provided.

S-parameter refers to a circuit result value used in RF and means a ratio of an input voltage to an output voltage on frequency distribution. S11 refers to Reflection Coefficient which means a value output by reflecting an input signal. It means that as the reflected values is getting smaller, the transmitted electric power becomes larger. In other words, as S11 has a small value or located in a lower area on the graph, it can be understood that wireless charging performance is more efficient.

S21 refers to Transmission Coefficient which means transmission efficiency of the energy or electric power transmitted by an external electric power supplying device. As the transmitted ratio becomes larger, transmission efficiency becomes higher. As S21 has a larger value or located in an upper area on the graph, transmission efficiency gets higher.

FIG. 5 shows a stiff peak in a specific frequency area. An area having a sharply variable value is a resonance frequency. The lengths and thicknesses of the matching circuit 235 and the resonators 230 may be adjusted to form a stiff peak in a wireless charging frequency band.

Figure 6:
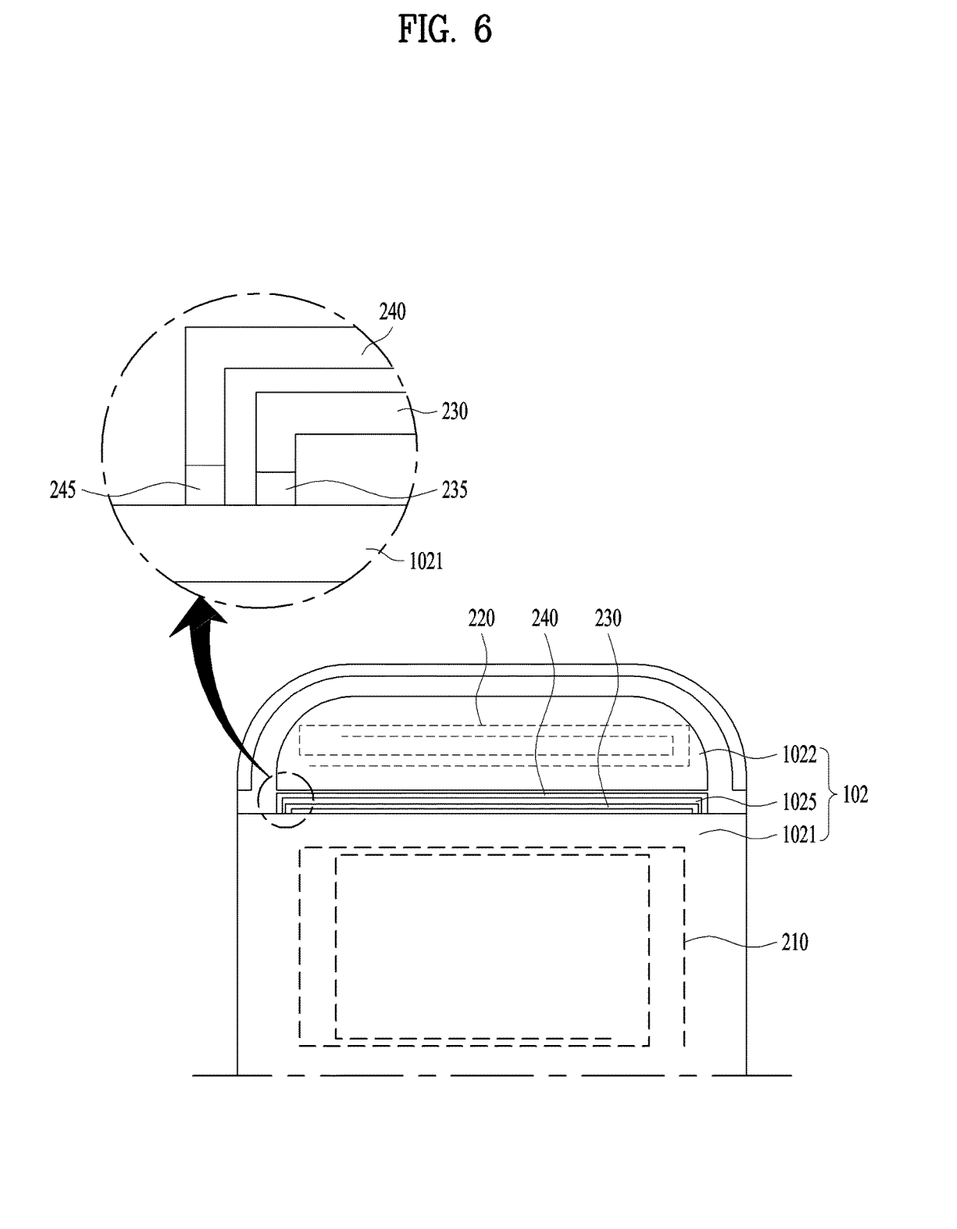
FIGS. 6 to 9 are conceptual diagrams illustrating various examples of a coil and a resonator in accordance with the present disclosure.

FIGS. 6 through to 9 are conceptual diagrams illustrating diverse example of the coil 210 and the resonators 230. As a basic example, one coil 210 and one resonance 230 are provided as shown in FIG. 3. The number of the coil 210 and the resonator 230 is changed to embody not only wireless charging but also an antenna for short range wireless techniques such as NFC.

When a plurality of coils and a plurality of resonators are provided, the terms of first, second, etc. may be used to distinguish the coils and the resonators from each other. One example shown in FIG. 6 shows a pair of coils 210 and a pair of resonators 230. A first coil 210 is a coil for wireless charging as mentioned in the example of FIG. 3 and arranged in a position corresponding to the first metal case 1021. The corresponding position to the first metal case 1021 means the position in which the first metal case 1021 is overlapped with the first coil 210, viewed from the rear surface of the mobile terminal shown in FIG. 6.

Figure 8:
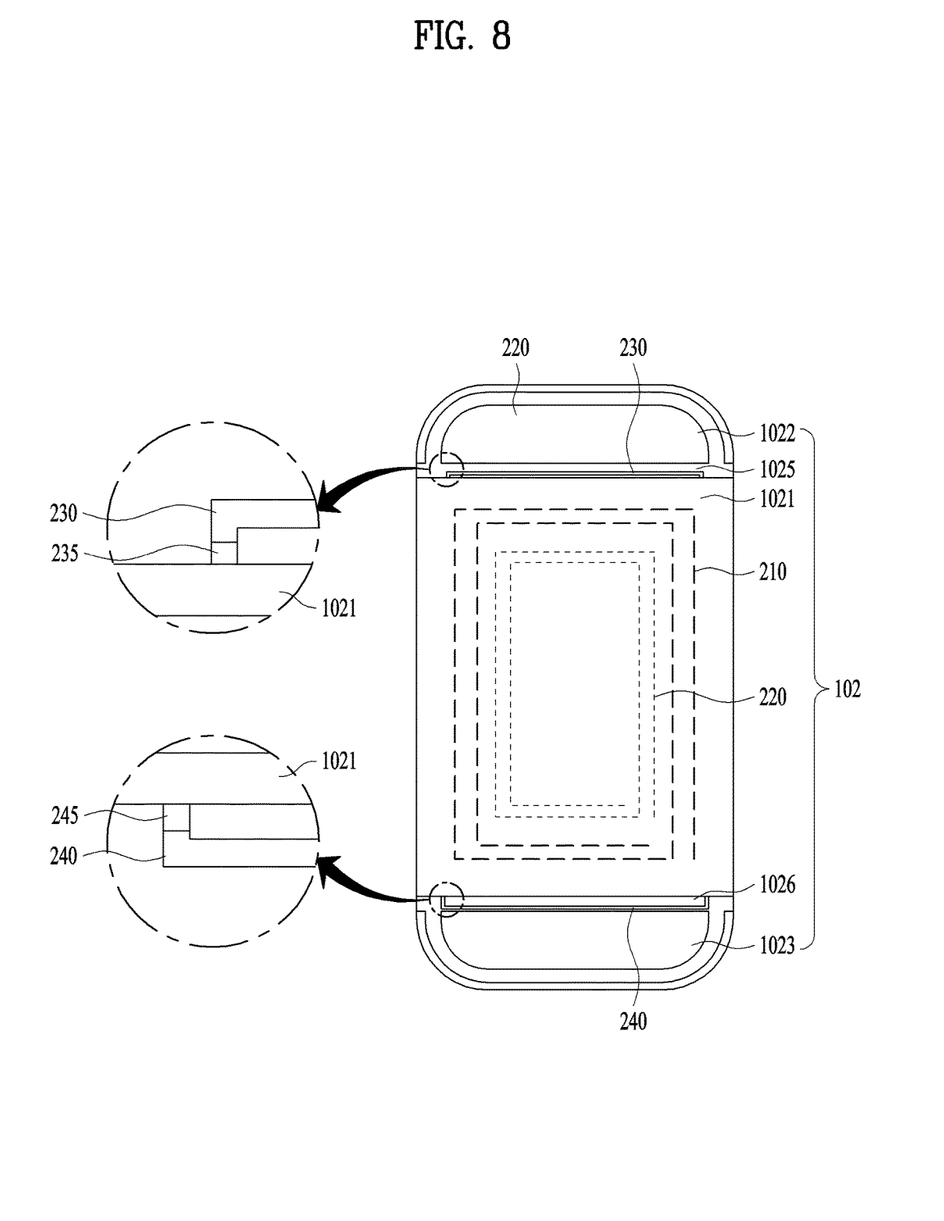

In this instance, a first resonator 230 is arranged in a position corresponding to the non-conductive case 1025 such that the first resonator 230 may not be overlapped with the first or second metal case 1021 or 1022. In the example, a second coil 220 is further provided which is arranged in the second metal case 1022. It is not necessary that the second coil 220 should be arranged in the second metal case 1022. Alternatively, the second coil 220 may be arranged in the first metal case 1021 together with the first coil as shown in FIG. 8.

When the first coil 210 is used for wireless charging, the second coil 220 is used for short range wireless communication. A resonance frequency of an electromagnetic wave the first coil 210 receives is 7.68 MHz and a resonance frequency of an electromagnetic wave the second coil 220 receives is 13 MHz. As the resonance frequencies are different from each other, a matching circuit 235 for the resonator related to the operation of the first coil 210 is different from the other matching circuit for the other resonator related to the operation of the second coil 220, such that the resonators may have different impedances, respectively.

Accordingly, the pair of the resonators may be arranged in the positions corresponding to the non-conductive case as shown in FIG. 6. The first resonator includes a first matching circuit 235 corresponding to the frequency of 7.68 MHz and the second resonator 240 includes a second matching circuit 245 corresponding to the frequency of 13 MHz.

Both of the first and second resonators 230 and 240 may be connected to the first metal case 1021. As an alternative example, one of the first and second resonators 230 and 240 may be connected to the first metal case 1021 and the other may be connected to the second metal case. As another alternative example, both of the resonators 230 and 240 may be connected to the main board 185. In this instance, the first metal case 1021 is substantially large and the two resonators 230, 240 connected to the first metal case 1021 may improve electromagnetic wave reception efficiency.

Figure 7:
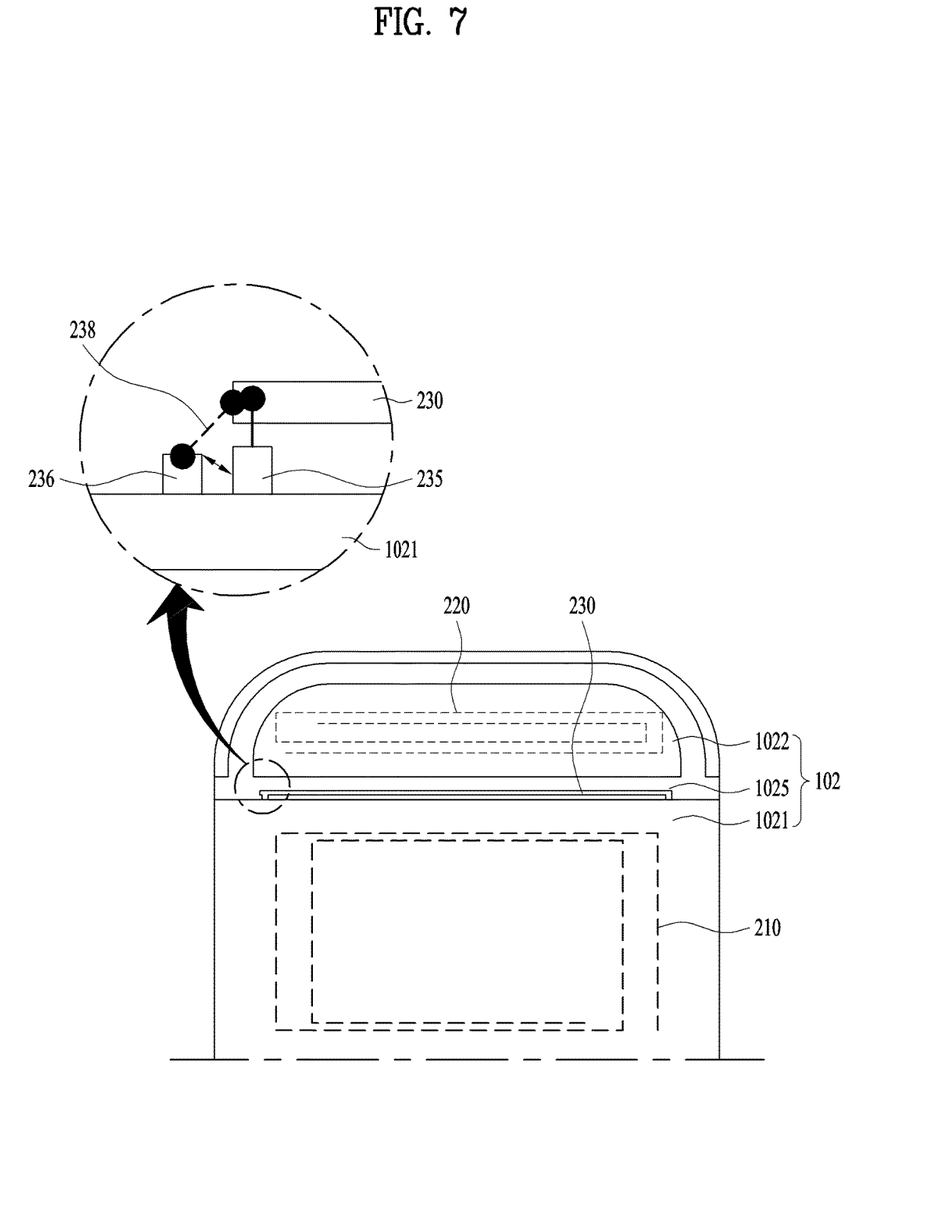

As a further alternative example, one resonator shown in FIG. 7 may be provided and the resonator may be used as the resonator for the first coil 210 and converted as the resonator for the second coil 220. The first resonator 230 shown in FIG. 7 includes a switch 238 selectively connected to a first matching circuit 235 or a third matching circuit 236. When the first coil 210 operates, the first resonator 230 is connected to the first matching circuit 235. When the second coil 220 operates, the first resonator 230 is connected to the third matching circuit 236.

The first resonator 230 connected to the third matching circuit 236 has a preset resonance frequency which is equal to a resonance frequency of the second resonance 240 connected to a second matching circuit 245.

In the example shown in FIG. 8, the first metal case 1021 includes three metal cases, a first non-conductive case 1025 arranged between a first metal case 1021 and a second metal case 1022 and a second non-conductive case 1026 arranged between the first metal case 1021 and a third metal case 1023. The first resonator 230 may be arranged in a position corresponding to the first non-conductive case 1025 and the second resonator 240 may be arranged in a position corresponding to the second non-conductive case 1026.

The positions of the first and second resonators 230 and 240 and the positions of the first and second coils 210 and 220 may be changed. As an alternative example, not a coil type in which the center of the first coil 210 is equal to the center of the second coil 220, the first coil 210 may be arranged adjacent to the first resonator 230 and the second coil 220 may be arranged adjacent to the second resonator 240.

Figure 9:
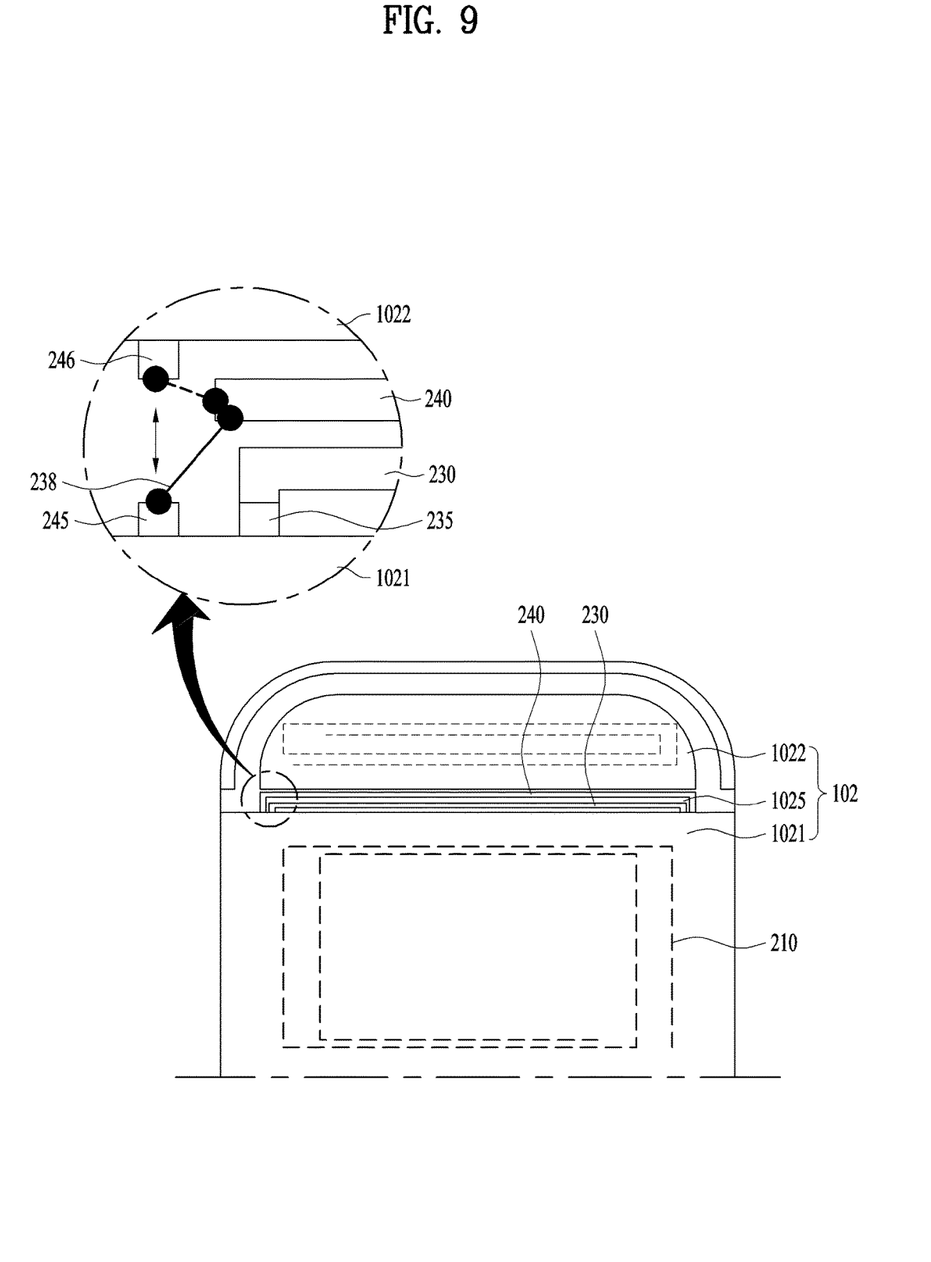

In FIG. 9, the first coil 210 and the second coil 220 are provided. The first and second resonators 230 and 240 are arranged in the positions corresponding to the first non-conductive case 1025.

The first resonator 230 is connected to the first matching circuit 235 and configured to resonate with a first frequency so as to operate the first coil 210. While, the second resonator 240 includes a switch 238 selectively connected to a fourth matching circuit 246 or a second matching circuit 245. When the second coil 220 operates, the second resonator 240 is connected to the second matching circuit 245. When the first coil 210 operates, the second resonator 240 is connected to the fourth matching circuit 246.

The second resonator 240 connected to the fourth matching circuit 246 has a preset resonance which is equal to a resonance frequency of the first resonator 230 connected to the first matching circuit 235.

In other words, both of the first and second resonators 230 and 240 are used to enhance charging efficiency of the first coil 210. Especially, when connected to the fourth matching circuit 246, the second resonator 240 is connected to the second metal case 1022 and the second metal case 1022 is also functioned to improve resonance performance together with the first metal case 1021.

As mentioned above, the examples of the mobile terminal in accordance with the present disclosure may enhance performance of the wireless communication unit and wireless charging performance, without design change of the housing having the metal case.

The foregoing embodiments are merely exemplary and are not to be considered as limiting the present disclosure. The present teachings can be readily applied to other types of methods and apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds, are therefore intended to be embraced by the appended claims.

What is claimed is:

1. A mobile terminal comprising:
a housing comprising a first metal case, a second metal case, and a first non-conductive case that is located between the first metal case and the second metal case;
a battery located in the housing;
a first coil located in the housing and located at an area covered by the first metal case;
a main board comprising a charging module configured to recharge the battery using electric current that flows in the first coil; and
a first resonator located at an area covered by the first non-conductive case.

2. The mobile terminal of claim 1, wherein:
the first metal case and the second metal case are positioned to form a slit therebetween;
the first non-conductive case is located in the slit; and
the first resonator is extended along the slit.

3. The mobile terminal of claim 1, wherein both ends of the first resonator are connected to the first metal case.

4. The mobile terminal of claim 3, wherein the main board is electrically insulated from the first metal case.

5. The mobile terminal of claim 1, wherein:
the main board comprises a ground electrically connected to the first metal case; and
at least one end of the first resonator is connected to the main board.

6. The mobile terminal of claim 1, further comprising:
a first matching circuit corresponding to a first frequency; and
a second coil located in the housing and configured to perform short range wireless communication using a signal having a second frequency.

7. The mobile terminal of claim 6, wherein the second coil is located at a position corresponding to the second metal case.

8. The mobile terminal of claim 6, further comprising:
a second resonator located at an area covered by the first non-conductive case, the second resonator comprising a second matching circuit corresponding to the second frequency.

9. The mobile terminal of claim 8, wherein:
the second resonator further comprises a third matching circuit corresponding to the first frequency; and
the mobile terminal further comprises a controller configured to cause the second resonator to be:
connected to the second matching circuit to perform the short range wireless communication; and
connected to the third matching circuit to recharge the battery.

10. The mobile terminal of claim 6, wherein the first resonator comprises:
a second matching circuit corresponding to the second frequency; and
a switch configured to be selectively connected to the first matching circuit or the second matching circuit,
wherein the mobile terminal further comprises a controller configured to cause the switch to:
connect the first resonator to the first matching circuit to recharge the battery; and
connect the first resonator to the second matching circuit to perform the short range wireless communication.

11. The mobile terminal of claim 10, further comprising:
a second resonator located at an area covered by the first non-conductive case and comprising a third matching circuit corresponding to the second frequency,
wherein:
the second resonator further comprises a switch configured to be selectively connected to the first metal case or the second metal case; and
the mobile terminal further comprises a controller configured to cause the second resonator to be:
connected to the first metal case to perform the short range wireless communication; and
connected to the second resonator to recharge the battery.

12. The mobile terminal of claim 6, wherein:
the second metal case is located at a first area of the first metal case;
the first coil and the second coil are located at a position corresponding to the first metal case; and
the mobile terminal further comprises:
a third metal case located at a second area of the first metal case;
a second non-conductive case located between the first metal case and the third metal case; and
a second resonator located at a position corresponding to the second non-conductive case.

13. The mobile terminal of claim 10, wherein the first matching circuit and the second matching circuit comprise one or more capacitors.

* * * * *